United States Patent
Ridenour

[15] 3,688,815
[45] Sept. 5, 1972

[54] RADIAL ARM SAW DEPTH GAUGE

[72] Inventor: Charles A. Ridenour, 183 Pocahontas St., Buckhannon, W. Va. 26201

[22] Filed: April 30, 1971

[21] Appl. No.: 139,048

[52] U.S. Cl. .................143/6 A, 33/125 R, 408/16
[51] Int. Cl. .................................................B27b 5/20
[58] Field of Search ...143/6 A, 157 R, 43 C; 408/16; 33/125, 161, 169 R, 169 B

[56] References Cited

UNITED STATES PATENTS 1,756,121   4/1930   Hedgpeth ...................143/6 A
2,696,851   12/1954   Davis........................143/6 A

*Primary Examiner*—Donald R. Schran
*Attorney*—Berman, Davidson and Berman

[57] ABSTRACT

A depth gauge for radial saws which can be adjusted to cooperate with saws of different diameters and can be further adjusted to regulate the depth of cut of the saw into the work.

A calibrated scale is provided to permit an accurate adjustment of the depth of cut.

5 Claims, 4 Drawing Figures

PATENTED SEP 5 1972  3,688,815
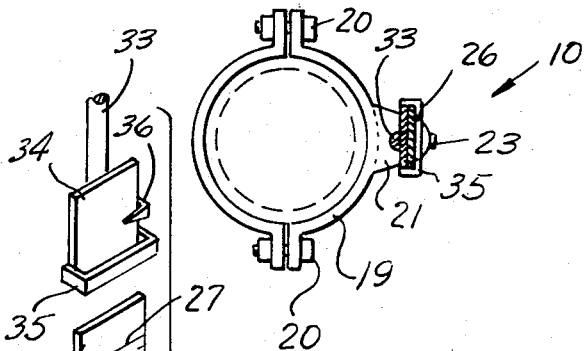
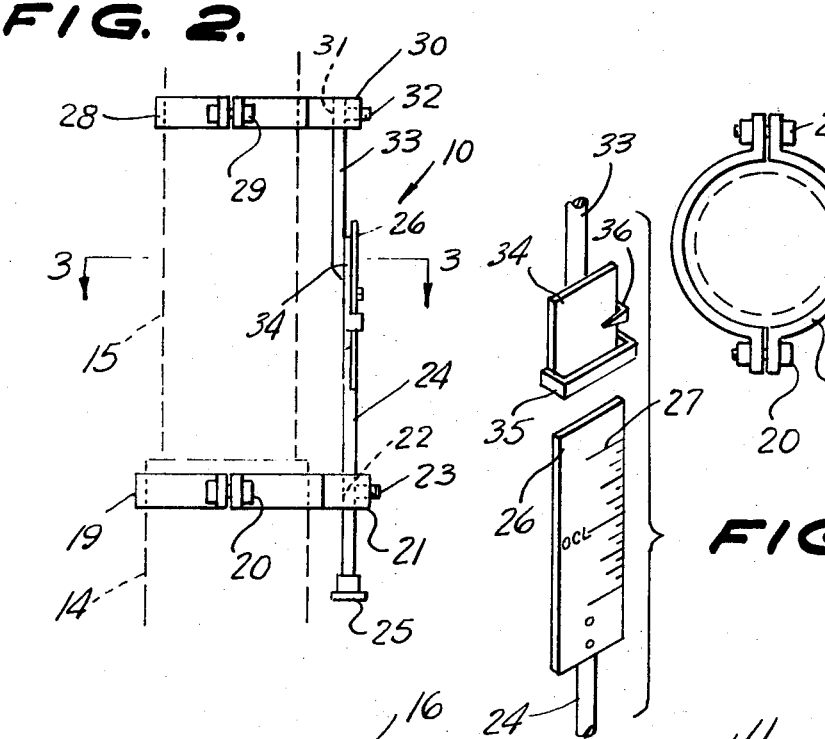
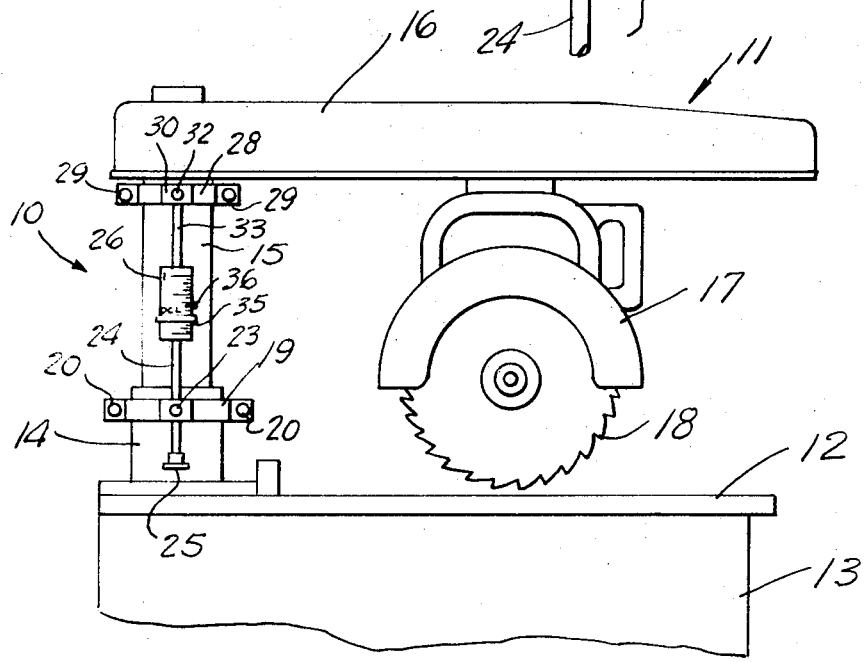
INVENTOR.
CHARLES A. RIDENOUR,
BY
Berman, Davidson & Berman,
ATTORNEYS 3,688,815

RADIAL ARM SAW DEPTH GAUGE

BACKGROUND OF THE INVENTION

Field of the Invention

The present invention is directed to a depth setting attachment for radial arm saws.

SUMMARY OF THE INVENTION

A depth gauge for radial arm saws in which a vertical scale is vertically adjustably clamped to a stationary portion of the upright post and a indicator member is vertically adjustably clamped to a movable portion of the upright post so that vertical movement of the saw may be accurately determined.

The primary object of the invention is to provide a depth gauge for radial arm saws which will accurately indicate the vertical position of the cutting edge of the saw blade with respect to the work.

Other objects and advantages will become apparent in the following specification when considered in the light of the attached drawings.

BRIEF DESCRIPTION OF THE DRAWINGS

FIG. 1 is a side elevation of the invention;

FIG. 2 is an enlarged rear elevation of the invention with the saw shown in broken lines;

FIG. 3 is a horizontal sectional view, taken along the line 3—3 of FIG. 2, looking in the direction of the arrows; and FIG. 4 is a perspective view of the gauge, shown partially broken away for convenience of illustration.

DESCRIPTION OF THE PREFERRED EMBODIMENT

Referring now to the drawings in detail, wherein like reference characters indicate like parts throughout the several figures, the reference numeral 10 indicates generally, a depth gauge, constructed in accordance with the invention, for attachment to a radial arm saw indicated generally at 11.

The saw 11 includes a table 12 mounted on a base 13 and having a fixed upstanding hollow post 14 secured to the base 13. A post 15 is telscopically mounted in the post 14 and is adapted to be vertically adjusted therein by any conventional means.

A cantlever arm 16 is rigidly secured to the upper end of the post 15 and extends horizontally across the table 12 vertically spaced thereabove. A saw 17 having a rotary saw blade 18 fixed thereto is mounted for movement across the table 12 along the underside of the arm 16. The radial arm saw 11 described above is conventional in design and is shown by way of illustration as the type of radial arm saw with which the depth gauge 10 is adapted to be used.

The depth gauge 10 includes a circular split clamp 19 secured together by bolts 20 on opposite sides thereof which are also used to tighten the clamp 19 onto the fixed post 14. The clamp 19 has a horizontal extension 21 projecting outwardly therefrom and having a vertical bore 22 extending therethrough. A set screw 23 extends into the extension 21 and intersects the bore 22.

A compensator rod 24 is mounted for vertical adjustment in the bore 22 and is adapted to be locked in adjusted position by set screw 23. A lifter 25 is fixed to the lower end of the compensator rod 24.

A flat plate 26 is rigidly secured to the upper end of the compensator rod 24 and has scale markings 27 extending vertically thereon with the center marking having the initials OCL stamped thereon indicating the zero center line.

A second split clamp 28 is secured together by bolts 29 and is adapted to be locked to the vertically adjustable post 15 thereby. The clamp 28 has a horizontal extension 30 formed thereon with a vertical bore 31 extending therethrough. A set screw 32 is threaded horizontally into the extension 30 to intersect the bore 31.

A vertical rod 33 is mounted for vertical adjustment in the bore 31 and is clamped in adjusted position by means of the set screw 32. A generally rectangular flat plate 34 is rigidly secured to the lower end of the rod 33 and has a rectangular loop 35 formed on its lower end to engage about the flat plate 26 and move freely in a vertical direction thereon. An indicator hand 36 is secured to the plate 34 and is arranged to overlie the plate 26 and cooperate with the indicia 27 to indicate the relative relationship between the compensator rod 24 and the rod 33.

In the use and operation of the invention it should be understood that even though radial arm saws may show that they are constructed to be used with a 10 inch blade they may also be used with blades of 9 inches, 8 inches, 7 inches, 6 inches, and with router blades which have even a smaller diameter.

The post 15 is adjusted by the conventional means provided in the radial arm saw 11 to bring the saw blade 18 into contact with the top surface of the table 12. With the saw blade in this position the compensator rod 24 is raised by loosening the set screw 23 and placing the fingers under the lifter 25 until the indicator arrow 36 is pointing to the OCL line on the line of indica 27. The set screw 32 and the set screw 23 are then tightened so that the indicator arrow 36 is indicating zero on the scale 27. The zero point on the scale 27 then is indicating the cut off position of the saw 17 in which the blade 18 exactly cuts through a board on the table 12 but not into the table 12. Adjustments of the adjustable post 15 will then raise the saw blade 18 and the exact amount that the saw blade 18 is raised will be directly indicated by movement of the indicator arrow 36 with respect to the OCL line on the scale 27. By using the gauge 10 in this manner the thickness of uncut board underlying the saw is indicted. If the depth of the cut of the saw blade in the work is to be gauged the saw blade 18 is brought down into contact with the work top surface and the gauge 10 adjusted so that the top surface is the zero center line. Additional adjustments of the saw for depth will then indicate the depth of cut made by the blade 18.

When using the radial arm saw 11 for routing operations the router blades (not shown) are brought into contact with the top surface of the work and the gauge is set in the same manner as described above so that the top surface of the work is the zero center line.

It should be understood while the clamps 19 and 28 have been illustrated as one means of securing the compensator rod 24 and the rod 33 to the posts 14, 15 it should be understood that any other means for securing the extension members 21, 30 to the posts 14, 15 may be used.

Having thus described the preferred embodiment of the invention it should be understood that numerous structural modifications and adaptations may be resorted to without departing from the spirit of the invention.

What is claimed is:

1. A depth gauge for radial arm saws of the type having a fixed post and a sliding post telescoped therein for vertically adjusting the radial arm saw with respect to its table comprising a vertically extensible gauge means vertically adjustable secured at one end to said fixed post and vertically adjustably secured at the opposite end to said vertically moveable post for indicating the relative vertical position of said posts to thereby indicate the vertical adjustment of said saw with respect to said table.

2. A device as claimed in claim 1 wherein said vertically extensible gauge means includes an indicia carrying gauge plate and an indicator plate carrying an indicator hand cooperating with sad gauge plate.

3. A device as claimed in claim 2 wherein said gauge plate is rigidly secured to a compensator rod mounted for vertical adjustment on said rigid post.

4. A device as claimed in claim 3 wherein said indicator hand is mounted on a plate carried on the lower end of a rod mounted for vertical adjustment on said vertically moveable post.

5. A device as claimed in claim 4 wherein a loop is provided on said last named plate encompassing said first named plate to maintain said plates in aligned relation during vertical adjustment therebetween.

* * * * *